United States Patent
Ghiasi et al.

(10) Patent No.: US 7,681,054 B2
(45) Date of Patent: Mar. 16, 2010

(54) PROCESSING PERFORMANCE IMPROVEMENT USING ACTIVITY FACTOR HEADROOM

(75) Inventors: Soraya Ghiasi, Austin, TX (US); Thomas Walter Keller, Austin, TX (US); Karthick Rajamani, Austin, TX (US); Freeman Leigh Rawson, III, Austin, TX (US); Juan C. Rubio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 11/538,131

(22) Filed: Oct. 3, 2006

(65) Prior Publication Data

US 2008/0082844 A1  Apr. 3, 2008

(51) Int. Cl.
G06F 1/32 (2006.01)
G06F 1/26 (2006.01)

(52) U.S. Cl. ............ 713/320; 713/300; 713/323; 320/127

(58) Field of Classification Search ........... 713/300, 713/320, 323; 320/127
See application file for complete search history.

(56) References Cited

U.S. PATENT DOCUMENTS

| | | | |
|---|---|---|---|
| 5,404,543 A | 4/1995 | Faucher et al. | |
| 5,623,647 A | 4/1997 | Maitra et al. | |
| 6,512,652 B1 | 1/2003 | Nelson et al. | |
| 6,513,124 B1* | 1/2003 | Furuichi et al. | 713/322 |
| 6,704,876 B1* | 3/2004 | Iacobovici et al. | 713/300 |
| 6,775,787 B2 | 8/2004 | Greene | |
| 6,795,927 B1 | 9/2004 | Altmedj et al. | |
| 6,795,928 B2 | 9/2004 | Bradley et al. | |
| 6,845,456 B1* | 1/2005 | Menezes et al. | 713/320 |
| 7,434,083 B1* | 10/2008 | Wilson | 713/600 |
| 2002/0133729 A1 | 9/2002 | Therien et al. | |
| 2002/0194509 A1 | 12/2002 | Plante et al. | |
| 2002/0194517 A1* | 12/2002 | Cohen et al. | 713/340 |
| 2003/0065960 A1* | 4/2003 | Rusu et al. | 713/300 |
| 2003/0126479 A1* | 7/2003 | Burns et al. | 713/300 |
| 2004/0041538 A1* | 3/2004 | Sklovsky | 320/127 |
| 2004/0059956 A1 | 3/2004 | Chakravarthy et al. | |
| 2004/0225902 A1 | 11/2004 | Cesare et al. | |
| 2004/0260957 A1 | 12/2004 | Jeddeloh | |

(Continued)

OTHER PUBLICATIONS

U.S. Appl. No. 11/380,101, filed Apr. 25, 2006, Brey, et al.

*Primary Examiner*—Thomas Lee
*Assistant Examiner*—Vincent T Tran
(74) *Attorney, Agent, or Firm*—Mitch Harris, Atty at Law, LLC; Andrew M. Harris; Libby Z. Handelsman (57) ABSTRACT

Processing system performance is improved while meeting power management constraints in a processing system by using activity factor headroom estimation. The method and system estimate the power consumption of the system from a model that relates measured activities at a present operating point to power consumption for any available operating point of one or more processors in the system. The method then chooses the operating point(s) with the highest performance among the available operating points that will still meet budgetary constraints or specific thresholds of power consumption. The budgetary constraints or specific thresholds may be dynamically adjusted, and the method will update the operating point(s) to maintain safe operation and maximize performance. The method provides the best performance for the executing workload while ensuring safe operation.

10 Claims, 4 Drawing Sheets

U.S. PATENT DOCUMENTS

| | | |
|---|---|---|
| 2005/0060594 A1* | 3/2005 | Barr et al. .................. 713/600 |
| 2005/0125701 A1 | 6/2005 | Van Hensbergen et al. |
| 2005/0125702 A1 | 6/2005 | Huang et al. |
| 2005/0125703 A1 | 6/2005 | Lefurgy et al. |
| 2005/0132238 A1 | 6/2005 | Nanja |
| 2005/0138442 A1 | 6/2005 | Keller, Jr. et al. |
| 2005/0160151 A1 | 7/2005 | Rawson, III et al. |
| 2006/0156042 A1 | 7/2006 | Desai et al. |
| 2006/0253715 A1* | 11/2006 | Ghiasi et al. ................ 713/300 |
| 2006/0288241 A1* | 12/2006 | Felter et al. ................. 713/300 |
| 2006/0294400 A1 | 12/2006 | Diefenbaugh et al. |
| 2007/0016814 A1* | 1/2007 | Rusu et al. .................. 713/320 |
| 2008/0141047 A1* | 6/2008 | Riviere-Cazaux ........... 713/300 |

* cited by examiner

PROCESSING PERFORMANCE IMPROVEMENT USING ACTIVITY FACTOR HEADROOM

This invention was made with Government Support under DARPA, NBCH3039004. THE GOVERNMENT HAS CERTAIN RIGHTS IN THIS INVENTION.

CROSS-REFERENCE TO RELATED APPLICATIONS

The present application is related to previously-filed co-pending U.S. patent applications: Ser. No. 10/727,319 filed on Dec. 3, 2003 entitled "METHOD AND SYSTEM FOR POWER MANAGEMENT INCLUDING DEVICE CONTROLLER-BASED DEVICE USE EVALUATION AND POWER-STATE CONTROL" and Ser. No. 11/380,101 filed on Apr. 25, 2006 and entitled "METHOD AND SYSTEM FOR PROVIDING PERFORMANCE ESTIMATIONS FOR A SPECIFIED POWER BUDGET." The above-referenced patent applications have at least one inventor in common with the present application and are assigned to the same assignee. The specification of the above-referenced patent applications are incorporated herein by reference.

BACKGROUND OF THE INVENTION

1. Technical Field

The present invention relates generally to power/performance management and measurement in processing systems, and more particularly, to a power management system and method that utilize activity factor headroom to improve processing performance.

2. Description of the Related Art

Computer systems are increasingly employing budgetary power management. Notebook computers, which must control energy usage to provide predictable battery life and to extend battery life, employ power management that scales system performance in accordance with those needs. Large scale rack server systems, in which maximum system performance is often dictated by power supply capability and/or cooling capability and sometimes facility and customer energy usage specifications, employ power management that throttle system performance so that operating energy usage requirements are met. Typically, the power management is provided by techniques such as dynamic voltage and frequency scaling (DVFS), which is typically a change in processor operating frequency and voltage consistent with a measured power consumption (which may be predetermined or dynamically measured). Groups of processors can be controlled by DVFS to meet a group power budget, for example, in the large-scale rack server systems mentioned above.

In present-day processors, which are typically complementary metal-oxide semiconductor (CMOS) or dynamic circuit designs, energy usage is a function of not only the voltage and frequency supplied to the processing device(s), but are also a function of how the operating workload is using the processing device(s). The power consumption of a processor includes both static power and dynamic power. The dynamic power of a processor can be modeled as $P=ACV^2F$, where F is the processor clock frequency, V is the core voltage, C is a lumped capacitance representing all of the switching nodes and A is an activity factor that relates the relative amount of switching events taking place over a given interval. A is strongly dependent on the workload being executed by the system, especially in present-day processors that include multiple cores and multiple functional units in each core, and for which utilization may vary widely by process. For example, a workload that includes no mathematically intensive applications at all might never use available floating-point units and a workload that is mathematically intensive may use the floating-point units, but only infrequently use processor bus interfaces. Other worst-case workloads may use all functions units to the same degree.

Because some workloads have a higher energy usage for a given operating point, the system must be designed (and power-managed) in order to meet system energy usage constraints under all possible workload conditions. Typically, a system's voltage/frequency operating point(s) are determined by a worst-case workload scenario, obtained by system profile tests. The voltage and frequency of the processor(s) are adjusted to set an energy usage point that meets the required power budget or other desired performance criteria such as thermal energy production for worst-case workload and operating conditions. Otherwise, the system could exceed the power consumption budget or thermal limits and potentially shut down or fail.

However, such power management does not provide the maximum possible performance for an arbitrary workload at a given operating point, since using a worst-case workload to determine the voltage/frequency operating point by necessity indicates that all other workloads operated at the same operating point will have available headroom for improved performance. For any real-world workload that does not match the worst-case workload, it is possible that the voltage/frequency operating point could be raised without violating the power management constraints set on the system. Therefore, performance of such systems could be improved over present levels, while still meeting the system power management constraints. The additional capacity available for such workloads due to a lower activity level compared to the worst-case workload activity level, at any given operating point, is referred to herein as activity factor headroom.

It is therefore desirable to provide a method and system for using the activity factor headroom to improve processing system performance.

SUMMARY OF THE INVENTION

The objective of improving processing system performance by using activity factor headroom is provided in a method, a computer performing the steps of the method and in a computer program product encoding program instructions for carrying out the steps of the method. The method may also be performed by a processor containing control logic for automatically performing the method.

The method and system monitor activity within a processor, estimate the power usage for the monitored activity for at least one other higher performance/power operating point, and control the operating point of the processor in conformity with the estimated power usage to meet a power budget.

The activity monitoring can be performed by event counters within the processor, for example a rate of instruction dispatches can be performed within each of the one or more processors and a power consumption estimated for the presently selected operating point can be determined from that rate using a model. If there appears to be activity headroom, i.e., the estimated power level is below the power budget, the power level for higher-power operating points of the processor is estimated and if the power budget will still be met, the operating point of the processor can be adjusted upward, accordingly. The result is an increase in processing system performance for workloads having an activity factor lower than that of a worst-case workload. Further, if the power consumption at the current operating point and workload is too close to the power budget, or otherwise exceeds a predetermined threshold, power consumption can be estimated at lower operating points. The highest-performance operating point having the power consumption sufficiently under the power budget or predetermined threshold is then selected as a "safe" operating point. Therefore, if the current operating conditions are too close to the power and/or thermal limits, a safer lower operating point with the highest possible performance under the power/thermal limits is selected. The power budget or threshold can also be adjusted dynamically and the method used to update the operating point when the power budget or threshold changes.

The activity monitoring can be performed by a set of event counters within processor that monitor the activity of multiple functional units within the processor, and the set can be selected as a subset of those event counters that are most sensitive to the power consumption of the present workload.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present invention concerns a technique for improving performance in a processing system that takes advantage of available headroom or "slack" between actual power consumption and budgetary requirements that varies from workload-to-workload. The technique of the present invention is applicable to a single processor or processor core and a circuit implementing the invention may be embedded in logic within such a processor or processor core, or may be implemented in part by an operating system or software power-management process executing on the processor being power-managed or an external processor such as a supervisor or service processor. The invention may also be applied to groups of processors or processor cores, with the added advantage that system power headroom may be apportioned to another processor (or core) if power consumption or global thermal production, rather than thermal production local to the processor being managed, is the budgetary constraint.

The technique of the present invention is a method of power management that may be implemented in hardware or software algorithms as mentioned above. The method uses activity level indications measured within the processor(s) in combination with the known power consumption operating point, e.g., processor frequency and voltage setting, at which the processor is currently operating. By knowing the operating point in combination with a measure of the level of internal activity of the processor, a model of the actual power consumption of the processor during an interval of operation can be estimated. Further, by knowing the power consumption characteristics of the processor for other operating points at activity levels corresponding to the measured activity level for the present operating point, the power consumption for the processor can be estimated for another operating point at a different performance and power consumption level than that of the present operating point. Once the power consumption is estimated for one or more higher level operating points, a determination is made of whether the power consumption constraints for the processor would be met at a higher operating point. The operating point is then raised if the power consumption constraints are expected to be met. Conversely, if the power consumption at the current operating point exceeds a threshold, the operating point is lowered to a maximum-performance operating point having an estimated power level below the threshold. If the power consumption or thermal constraints change, the calculations may be repeated using the latest workload activity measurements and the operating point adjusted accordingly in order to maximize performance while maintaining power consumption within the new constraints.

Figure 1:
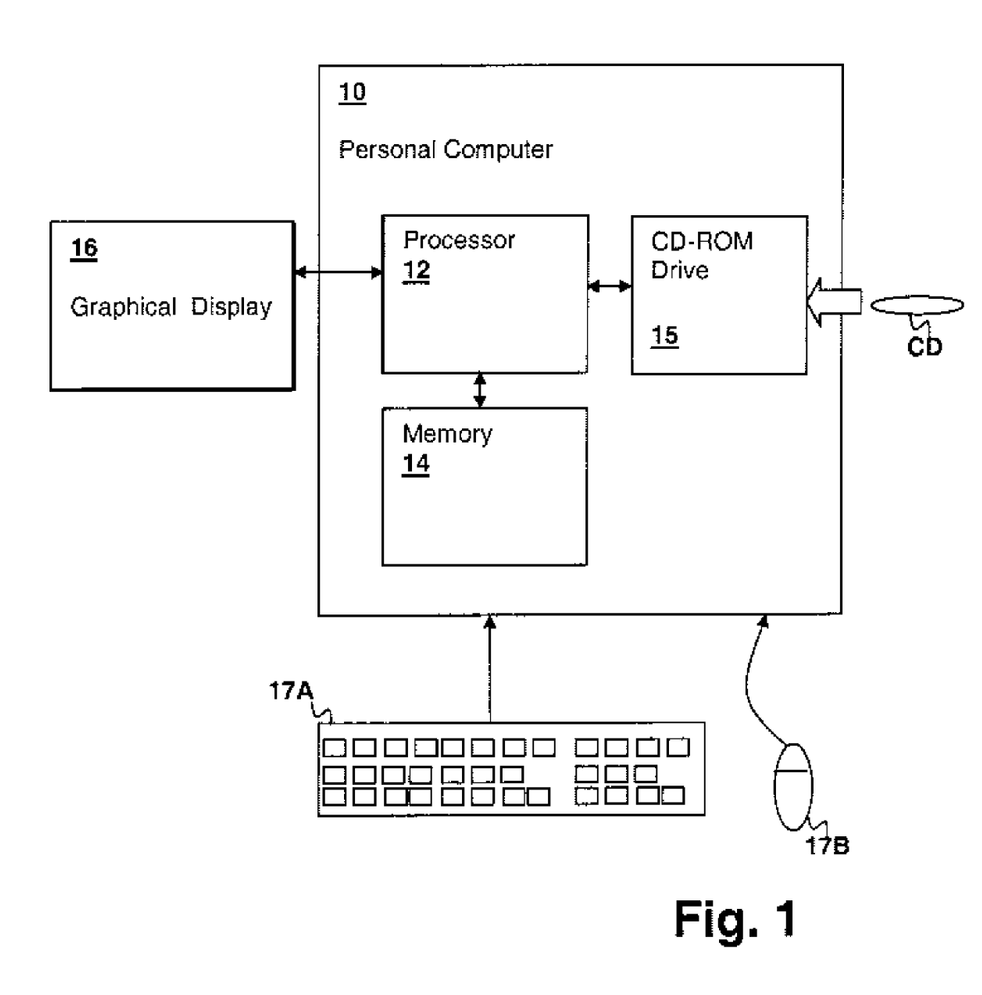
FIG. 1 is a block diagram of a uniprocessor computing system in accordance with an embodiment of the invention.

Referring now to FIG. 1, a uniprocessor computer system in which the present invention can be practiced is illustrated. A personal computer 10 may be a notebook computer in which all of the depicted peripheral units are integrated, or a desktop computer as shown. Personal computer system 10 includes a graphical display 16 for providing visual information to a user and may be used to monitor operational values received from embodiments of the present invention, as well as control panels for enabling and disabling programs that perform the methods of the present invention. A keyboard 17A and a pointing device 17B are attached to personal computer 10 for receiving user input. Personal computer 10 includes a processor 12 coupled to a memory 14 that contains program instructions for execution by processor 12 including program instructions in accordance with embodiments of the present invention. Computer program products in accordance with embodiments the present invention include media such as compact disc CD that stores encoded program instructions that may be read by CD-ROM drive 15 and stored in memory 14 for execution by processor 12. Processor 12 may include control logic in accordance with the present invention that implements the entire power consumption control methodology, or may include only the activity measurement units that will be described in further detail below. The activity measurement unit is used to provide the activity level input to either the control logic or software algorithms implementing the method of the present invention.

Figure 2:
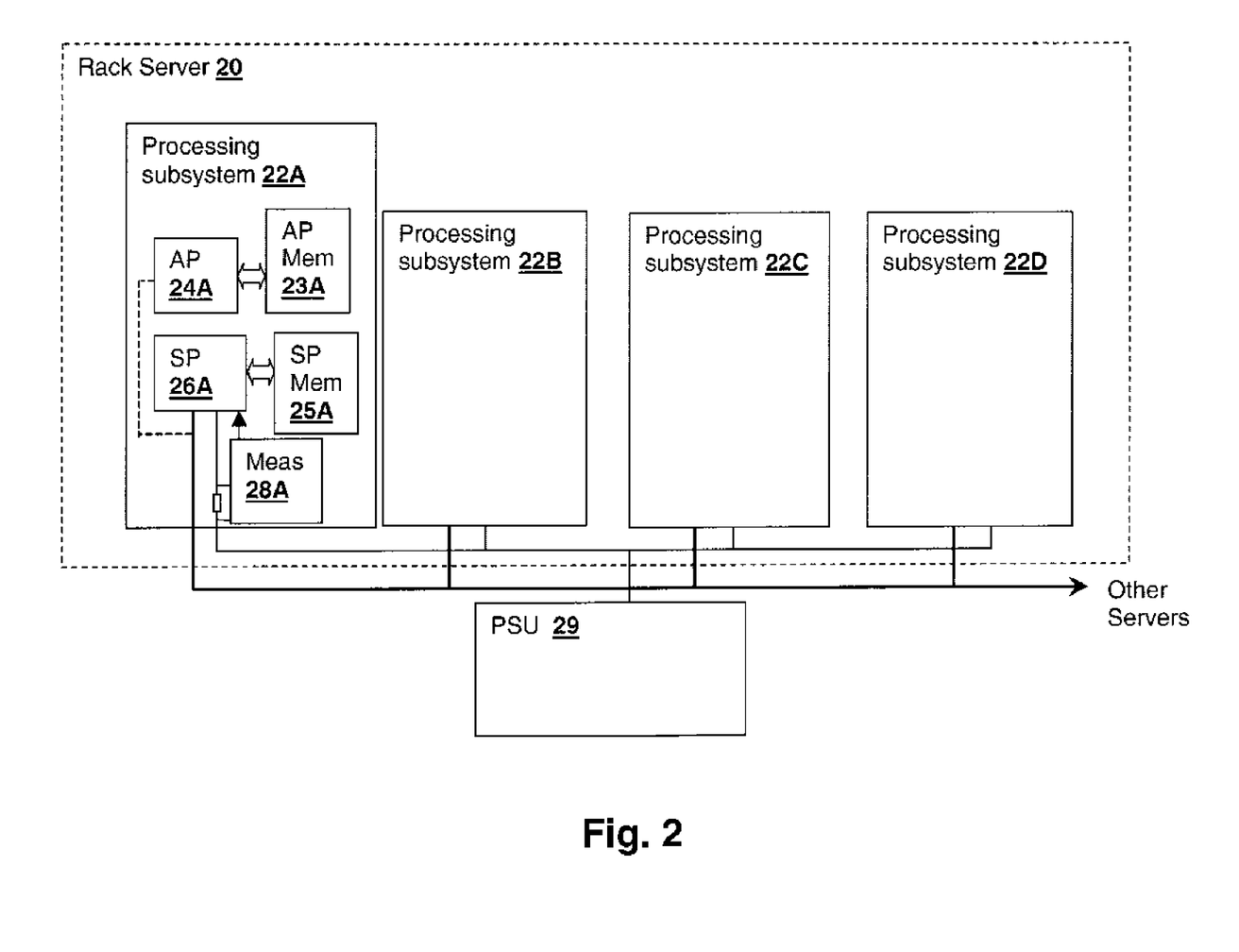
FIG. 2 is a block diagram of a multiple processing unit computing system in accordance with an embodiment of the invention.

Referring now to FIG. 2, a multi-processor processing system is shown in accordance with an embodiment of the present invention in the form of a rack server 20. Processing sub-systems 22A-22D are included within rack server 20 and may be coupled to other server systems by a bus or other interface such as a high-speed local area network (LAN) connection. Processing subsystems 22A-22D are coupled to a power supply unit (PSU) 29 that supplies power to processing subsystems 22A-22D and may include global power measurement that may be used in some embodiments of the present invention to determine overall power usage and availability. Each processing sub-system 22A-22D may also include an individual power measurement circuit 28A to determine changes in individual power consumption of each of processing sub-systems 22A-22D. However, no power usage measurement (global or individual) is necessary to practice the methods of the present invention. Such measurement is used in some embodiments to better inform the algorithms relating activity level, power consumption and operating point as to actual changes in power consumption level, as well as absolute values of power consumption as a check on whether budgetary requirements are being met.

Each processing sub-system 22A-22D, as illustrated, includes at least one application processor 24A coupled to an application memory 23A and a service processor 26A coupled to a service processor memory 25A. Either service processor 26A or application processor 24A can execute program instructions implementing methods in accordance with software algorithm embodiments of the present invention and it is not a limitation of the present invention as to where the algorithm is located, only that the activity level of the application processor 24A can be retrieved and that the operating point of application processor 24A can be adjusted in conformity with the results of the computation. For illustrative purposes, the control of voltage and frequency of operation is illustrated as being controlled from registers within processor 12 of FIG. 1 and application processor 24A of FIG. 2 as will be shown in further detail below. However, it is understood that clock frequencies of a processor may be adjusted external to a processor, for example an external phase-lock loop (PLL) or programmable oscillator may be used to supply the processor clock, and a programmable power supply (PPS) may be included for each processor, such as application processor 24A and one PPS for each processor may be incorporated in processing subsystems 22A-D. It is understood that the present invention applies to a single-chip multi-core processor power management scheme with independent control of core frequency and/or core voltage and having per-core and global (per chip) power budgets, as well as the multi-processor scheme illustrated herein.

Figure 3:
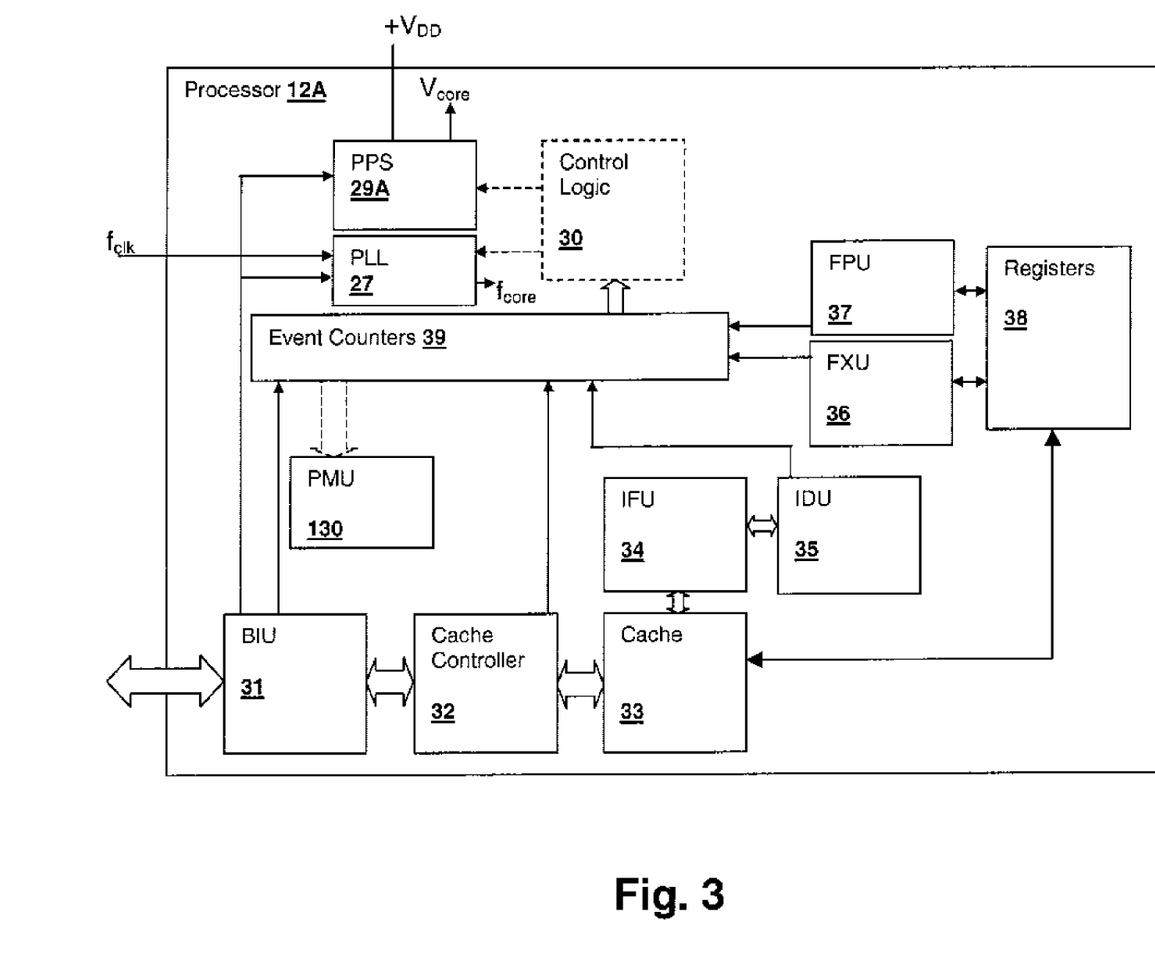
FIG. 3 is a block diagram of a processor in accordance with an embodiment of the invention.

Referring now to FIG. 3, a processor 12A, in accordance with an embodiment of the present invention is shown. Processor 12A includes a number of functional units, such as floating point unit (FPU) 37, fixed-point unit (FXU) 36, which are coupled to registers 38 for receiving and storing operand data values and results of program instruction operations, an on-board cache memory 33 coupled to a cache controller 32 that loads and stores values to and from cache memory 33 via a bus interface unit (BIU) 31, an instruction fetch unit (IFU) 34 for controlling the fetching of instruction streams from cache memory 33 an instruction dispatch unit 35 that controls the dispatch of instructions to functional units of processor 12 such as FPU 37, FXU 36, cache controller 32 and BIU 31, and optionally, a performance/event monitoring unit (PMU) 130 that provides access to the different event counts accumulated in event counters 39. Processor 12A also includes a PPS 29A for providing the core power supply voltage $V_{core}$ from an external power supply voltage source $V_{DD}$ under commands received from a dedicated service processor interface (not shown) or from an internal control logic 30 in accordance with an embodiment of the present invention. Processor 12A also includes a PLL 27 for setting an internal clock frequency $f_{core}$ via a multiplication factor from an external clocks source $f_{clk}$.

Processor 12A may also include control logic 30 in accordance with an embodiment of the present invention that implements the entire methodology described herein. Control logic 30 is coupled to one or more event counters 39 and/or the outputs of PMU 130 that provide a measure of the activity level of functional units within processor 12A and thus a measure of the actual power consumption of processor 12 for a given operating point. Event counters 39 provide an activity measurement unit that can count a single event such as when each instruction is dispatched by IDU 35 and/or may count multiple events such as operations performed or completed by FPU 37, FXU 36, cache controller 32 and BIU 31 in order to provide input data for a model of activity scaling for different operating points and power consumption determined from activity measurement with an increased number of degrees of variability. Further, control logic 30 may select a different subset of event counters 39, or change the power consumption estimation model, in response to determining whether the estimated power level for another operating point matches the actual power consumed at that other operating point when that operating point is selected by control logic 30. Alternatively, if the method is performed by an algorithm executed by a processor external to processor 12A or by program instructions executed by processor 12, only the event counters 39 are required and are coupled to PMU 130 for access by external programs. Event counters 39 can also be readable as registers or internal memory locations of processor 12A for readability by algorithms in accordance with embodiments of the present invention that are executed by processor 12A.

PPS 29A may also include power consumption measuring capability in the form of core current measurement for the purpose of refining the subset of event counters 39 or the estimation model automatically as described above, so that resort to external power consumption measurements is not required. Control logic 30, or an external or internally executed software algorithm, controls PPS 29A and PLL 27 to set a new operating point if sufficient headroom is determined to be present at a higher operating point for the current workload according to a power consumption model that is either implemented in the algorithm or hard-wired into control logic 30 (parameters of the algorithm may still be made programmable via externally settable storage locations within control logic 30). Control logic 30 may also set a lower operating point for the current workload if insufficient headroom is present at the presently selected operating point. For example, the following expression models power consumption versus activity indications from event counter 39 (instruction dispatches):

$$P(f,V)=A(f,V)*IDR+B(f,V)$$

where f is the core frequency, V is the core voltage, A(f,V) is a variable portion of the power consumption P(f,V) and B(f, V) is an invariant (with activity) portion of the power consumption and IDR is the instruction dispatch rate or other activity indicator as described above. The difference between P(f,V) and the budgetary power figure is the headroom or "slack." If the power budget or other power consumption threshold is changed dynamically, control logic 30 can adjust the operating point using the present power estimate, raising the operating point if there is additional headroom under the new budget, or lowering the operating point if the headroom is not sufficient.

The slack can be utilized according to the model described below. For an operating point (f',V') higher than the current operating point, the method can compute IDR(f')=IDR(f)*f'/f and for an operating point lower than the current operating point (f", V"), the method can set IDR(f")=IDR(f). The above model provides a conservative estimate in that for increases in the operating point frequency, the model assumes that the IDR scales linearly, which represents a workload that is computation bound. The linear assumption is a conservative estimate in that linear increases in frequency will not generally produce a linear increase in activity and will never exceed a linear increase due to the inherent dependence of the IDR on the clock rate in the maximum theoretical case. When decreasing the operating point frequency, the model assumes a memory-bound workload (or one constrained by other external factors) for which no change occurs with frequency, implying a minimum reduction in power consumption and thus the most conservative estimate. Using the computed IDR(f') or IDR(f''), when activity level or power budget indicates that the operating point should be changed, the power at the new operating point(s) can be computed as:

$$P(f',V')=A(f',V')*IDR(f)*(f'/f)+B(f',V')$$

for an upward step in power/performance, or $$P(f'',V'')=A(f'',V'')*IDR(f)+B(f'',V'')$$

for a downward step in power/performance. While the model described above provides a linear mechanism that can appropriately control the system of the present invention, more sophisticated non-linear or higher order models may be employed to provide more accurate control with less conservative constraints. Therefore, such models can utilize more of the available power consumption headroom.

The value(s) of the event counters 39 are generally oversampled by a factor, for example of 10×, permitting filtering of momentary increases or decreases in processor activity. The average or other filtered value is then used to determine if the power consumption is significantly below the power budget, and if so, all potential higher performance operating points can be examined using the above models. Then, if a higher operating point is indicated that would provide more performance within the power budget, the voltage of the core is adjusted upward and then the frequency of the core is raised. Similarly, when the operating point must be adjusted downward, the frequency of the core is lowered and then the voltage is lowered. The above equations can be used to model individual processors in groups of processor budgets by summing the estimates and finding combinations of operating points that utilize any determined headroom as effectively as possible by maximizing operating points of one or more processors within the system to use the available headroom. Similarly, adjustments of the operating point to meet a new power budget may require adjusting all of the operating points of all processors (or cores) if the specified budget is only a global limit on the amount of power that can be consumed by all of the processors in the system. The present invention can manage more complex power budgets that include both global and local power budgets and power budgets having an even greater number of hierarchical levels. In such implementations, the method of the present invention adjusts the individual operating points of the processors (or cores) such that all budgets are met and performance is maximized by using any available headroom at each level.

Figure 4:
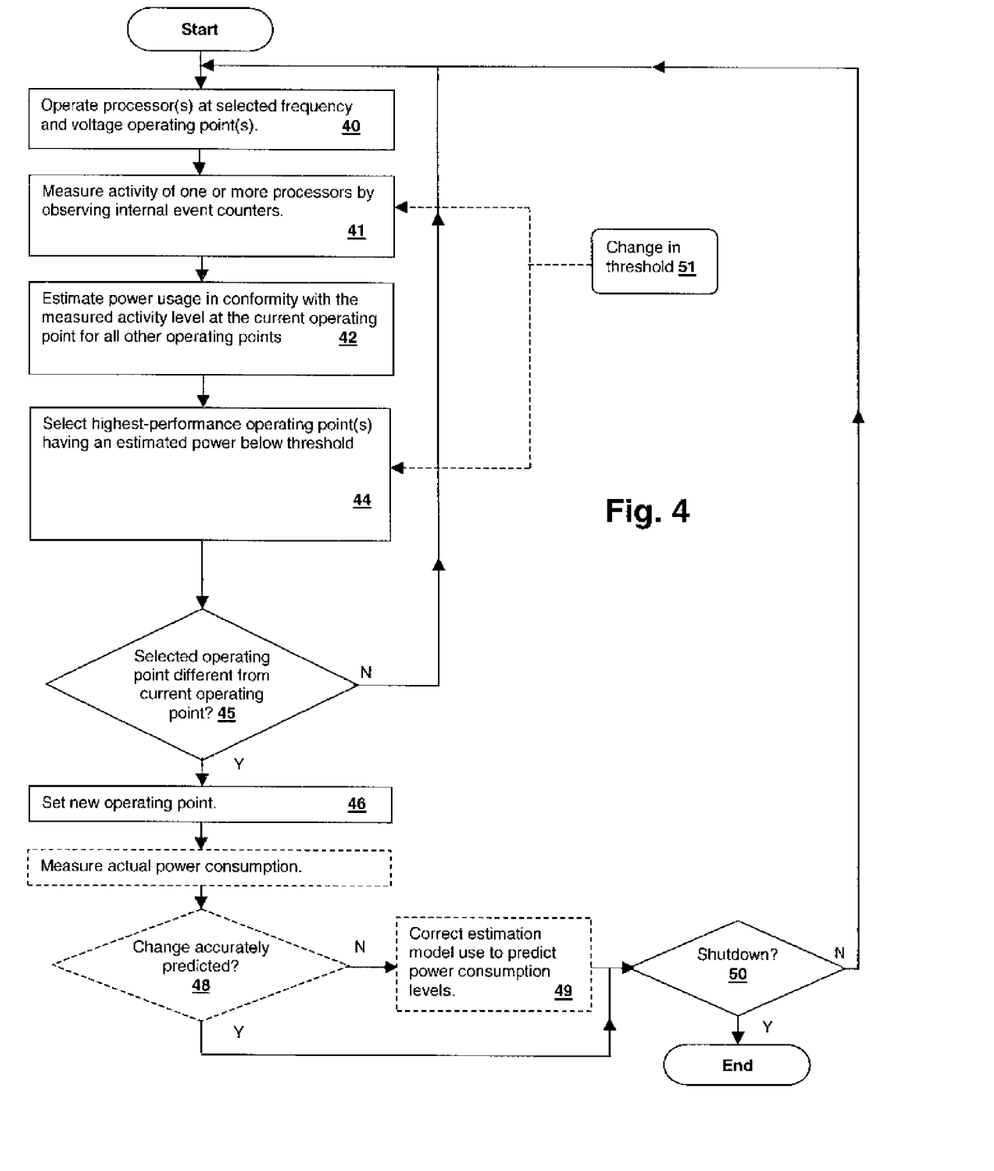
FIG. 4 is a flowchart depicting a method in accordance with an embodiment of the present invention.

Referring now to FIG. 4, a method in accordance with an embodiment of the present invention is shown, and which may be implemented in control logic 30 of FIG. 3 or by program instructions within memory 14 of FIG. 1, or within application memory 24A or service processor memory 25A of FIG. 2. Optional portions of the algorithm are shown in dashed blocks. First, one or more processors executes a workload at selected frequency/voltage operating point(s) (step 40). During execution of the workload, activity is measured within the processor(s) by observing event counters internal to the processor(s) (step 41). The power usage of the processor(s) is estimated in conformity with the measured activity level for the presently selected operating point and for all other operating points by scaling according to the model described above (step 42). Then, the highest-performance operating point having an estimated power below the threshold is selected (step 44). If the chosen operating point is same as current operating point (decision 45), the processor(s) is left at that operating point.

If the newly selected operating point differs from the previously-selected operating point (decision 45), then the operating point selected in step 44 is set as the new operating point (step 46). Optionally, actual power consumption for the new operating point can be measured (step 47) and if the change in power consumption is not accurately predicted (decision 48), then the subset of event counters used to determine activity level or coefficients or other characteristics of the model can be changed (step 49) in embodiments of the invention that provide for measurement of actual power consumption. Until the algorithm or system is shut down (decision 50), steps 40-49 are repeated. If the power budget is changed or another change to the power consumption threshold(s) is made during operation (event 51), processing proceeds from step 41 or step 44, depending on whether or not the activity levels are re-measured and the operating points re-evaluated for predicted power consumption levels prior to selecting a new operating point, which is optional. Then, the operating point(s) of the processor(s) is adjusted according to the new threshold. However, all other processing proceeds as described above and the algorithm continues to operate until shut down (decision 50).

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method of controlling power consumption in a processing system, said method comprising:

measuring an activity level within a processor of said processing system, wherein said processor operates at one of multiple selectable operating points corresponding to differing levels of power consumption, wherein said measuring is performed by event counters that indicate a usage of multiple functional units within said processor;

predicting a power consumption level of said processor for an operating point other than a present operating point of said processor, by calculating a predicted power consumption level in from the measured activity level at the presently selected operating point of said processor;

determining whether or not said predicted power consumption of said processor would yield a power consumption higher than a threshold if at least one other operating point were selected; and in response to determining that said processor would not yield a power consumption higher than said threshold if said at least one other operating point were selected, selecting said at least one other operating point as an operating point of said processor;

dynamically measuring actual power consumption of said processor at intervals of operation of said processing system;

observing a relationship between changes in said actual power consumption and values of said set of event counters; and revising a model relating predicted power consumption and said values of said set of event counters in conformity with a result of said observing.

2. The method of claim 1, further comprising modifying said threshold and re-evaluating a result of said selecting in conformity with said modified threshold.

3. The method of claim 1, wherein said method further comprises:
dynamically measuring actual power consumption of said processor at intervals of operation of said processing system;
observing a relationship between changes in said actual power consumption and values of said set of event counters; and
selecting said set of said set of event counters in conformity with said observed relationship, whereby said set of event counters is selected as those event counters having count values most sensitive to changes in said actual power consumption, and wherein subsequent repetitions of said measuring perform said measuring with said set of event counters.

4. The method of claim 1, further comprising prior to said predicting, determining whether or not a present power consumption of said processor said is less than said threshold, and wherein said predicting, determining and selecting are performed in response to determining that said present power consumption of said processor is less than said threshold.

5. A system, comprising at one or more processors coupled to at least one memory for storing program instructions for execution by said one or more processors for performing power management, wherein said program instructions comprise program instructions for:
measuring an activity level within a processor of said processing system, wherein said processor operates at one of multiple selectable operating points corresponding to differing levels of power consumption, wherein said measuring is performed by event counters that indicate a usage of multiple functional units within said processor;
predicting a power consumption level of said processor for an operating point other than a present operating point of said processor, by calculating a predicted power consumption level in from the measured activity level at the presently selected operating point of said processor;
determining whether or not said predicted power consumption of said processor would yield a power consumption higher than a threshold if at least one other operating point were selected; and
in response to determining that said processor would not yield a power consumption higher than said threshold if said at least one other operating point were selected, selecting said at least one other operating point as an operating point of said processor;
dynamically measuring actual power consumption of said processor at intervals of operation of said processing system;
observing a relationship between changes in said actual power consumption and values of said set of event counters; and
revising a model relating predicted power consumption and said values of said set of event counters in conformity with a result of said observing.

6. The system of claim 5, further comprising program instructions for modifying said threshold and re-evaluating a result of said selecting in conformity with said modified threshold.

7. The system of claim 5, wherein said program instructions further comprise program instructions for:
dynamically measuring actual power consumption of said processor at intervals of operation of said processing system;
observing a relationship between changes in said actual power consumption and values of said set of event counters; and
selecting said set of said set of event counters in conformity with said observed relationship, whereby said set of event counters is selected as those event counters having count values most sensitive to changes in said actual power consumption.

8. The system of claim 5, wherein said program instructions further comprise program instructions for execution prior to execution of said program instructions for predicting, that determine whether or not a present power consumption of said processor is less than said threshold, and wherein said program instructions for predicting, determining and selecting are executed only in response to determining that said estimated power consumption of said processor is less than said threshold.

9. A computer program product comprising storage media containing program instructions for execution by a processor for performing power management, said program instructions comprising program instructions for:
measuring an activity level within a processor of said processing system, wherein said processor operates at one of multiple selectable operating points corresponding to differing levels of power consumption, wherein said measuring is performed by event counters that indicate a usage of multiple functional units within said processor;
predicting a power consumption level of said processor for an operating point other than a present operating point of said processor, by calculating a predicted power consumption level in from the measured activity level at the presently selected operating point of said processor;
determining whether or not said predicted power consumption of said processor would yield a power consumption higher than a threshold if at least one other operating point were selected; and
in response to determining that said processor would not yield a power consumption higher than said threshold if said at least one other operating point were selected, selecting said at least one other operating point as an operating point of said processor;
dynamically measuring actual power consumption of said processor at intervals of operation of said processing system;
observing a relationship between changes in said actual power consumption and values of said set of event counters; and
revising a model relating predicted power consumption and said values of said set of event counters in conformity with a result of said observing.

10. The computer program product of claim 9, wherein said program instructions for retrieving retrieve counts from a set of event counters within said processor, and wherein said program instructions further comprise program instructions for:
dynamically measuring actual power consumption of said processor at intervals of operation of said processing system;
observing a relationship between changes in said actual power consumption and values of said set of event counters; and
selecting said set of event counters in conformity with said observed relationship, whereby said set of event counters is selected as those event counters reflective of greatest changes in said actual power consumption.

* * * * *